Figure 1:
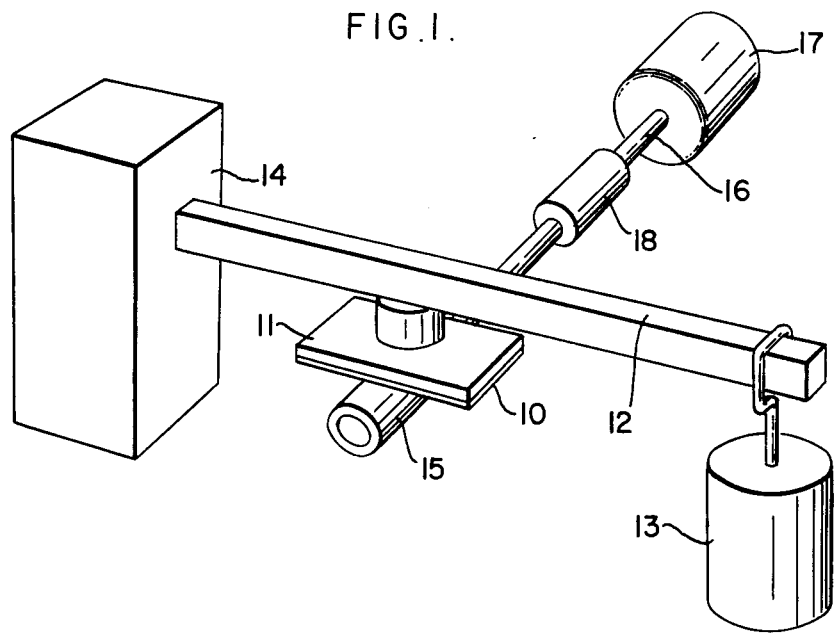

United States Patent [19]

Kinner et al.

[11] 4,200,541

[45] Apr. 29, 1980

[54] BEARING MATERIALS

[75] Inventors: George H. Kinner, Fleet; John K. Lancaster, Reading, both of England

[73] Assignee: National Research Development Corporation, London, England

[21] Appl. No.: 857,025

[22] Filed: Dec. 2, 1977

[30] Foreign Application Priority Data

Dec. 6, 1976 [GB] United Kingdom ............... 50675/76

[51] Int. Cl.$^2$ ........................ C10M 7/28; C10M 7/06; C10M 7/02
[52] U.S. Cl. ............................ 252/12.2; 308/DIG. 9; 427/54.1; 427/264; 427/309; 428/613; 430/323
[58] Field of Search ................................ 252/12.2, 12; 308/DIG. 9; 427/54; 428/613

[56] References Cited

U.S. PATENT DOCUMENTS

| | | | |
|---|---|---|---|
| 3,751,271 | 8/1973 | Kimura et al. ....................... | 428/613 |
| 3,883,314 | 5/1975 | Schnyder et al. .................... | 252/12.2 |
| 3,900,629 | 8/1975 | Spencer .................................. | 428/613 |
| 4,096,075 | 6/1978 | Nakamura ............................ | 252/12.2 |

Primary Examiner—Irving Vaughn
Attorney, Agent, or Firm—Cushman, Darby & Cushman

[57] ABSTRACT

The specification discloses advantageous dry bearing materials in which a material having characteristics making it useful as a dry bearing material has on its contacting or bearing surface a multiplicity of closely spaced, small, blind holes each filled with solid lubricant. It has been found that the holes should be less than 1 mm in diameter and have a center to center spacing of less than 1 mm and the specification discloses a phosphor bronze material of the invention using a polytetrafluoroethylene/lead solid lubricant of useful properties.

21 Claims, 10 Drawing Figures

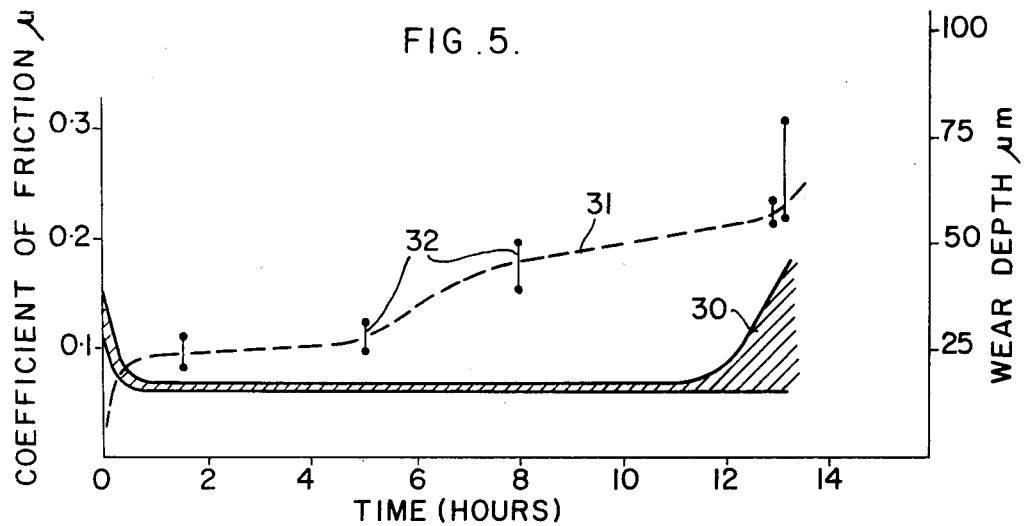
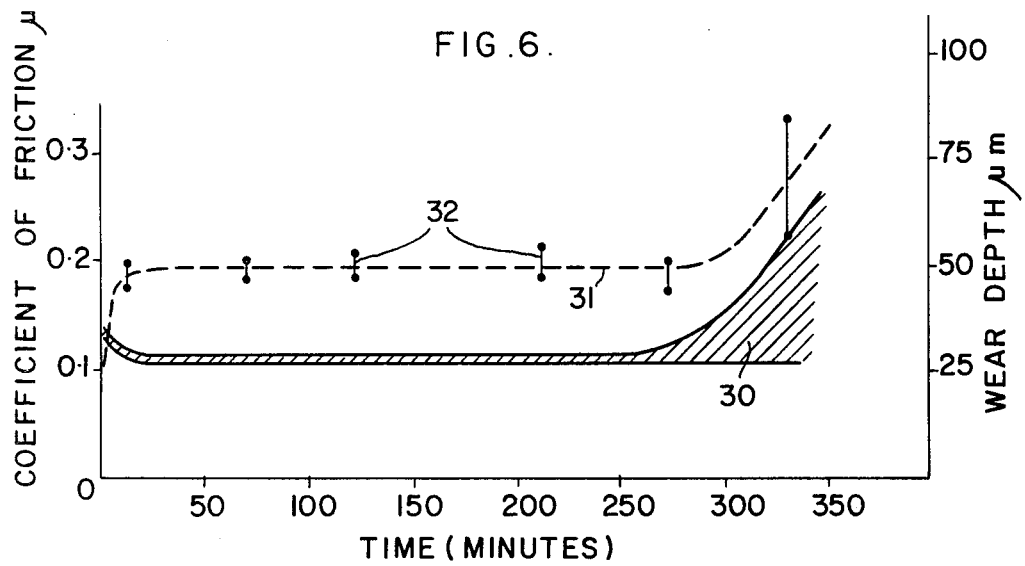

BEARING MATERIALS

The present invention is concerned with dry bearing materials.

Bearings, and dry bearings in particular, often consist of a lining material supported on a strong, hard substrate. Suitable lining materials fall generally into three broad classes polytetrafluoroethylene (hereafter PTFE) fibre or filled PTFE, which may also include other fibres for example glass; thin films of lamellar solid lubricants bonded to the substrate by an organic or an inorganic binder; or a porous metal, generally produced by powder metallurgical techniques, the pores being filled with a suitable solid lubricant material, for example, a mixture of PTFE and lead.

Each of these types has its own particular advantages and disadvantages. For example PTFE fibre and PTFE based liners and the like can have high load carrying capacities (say, up to about 400 MPa), but they have low heat conductivities and thus had to be restricted to low speeds (say, not more than about 0.5 m/s). The second type can have very high load bearing capacities and be capable of high speed operation but the wear life may be unpredictable and failure sudden and catastrophic. The last mentioned tend to have intermediate properties with load bearing capacities of up to about 150 MPa and limiting speeds of up to about 10 m/s.

In accordance with the present invention material suitable for use in a dry bearing or as a lining material in a dry bearing consists of a matrix of metal having a multiplicity of closely spaced, small blind holes in its bearing surface, the said holes being filled with a solid lubricant.

Bearings are known in which solid lubricants are provided in relatively large machined slots or holes in the bearing surfaces but it is difficult to ensure even distribution of the solid lubricant across the bearing surfaces using such a technique. In bearing materials of the present invention the holes are generally less than 1 mm across and are spaced less than 1 mm apart, thus ensuring an even distribution of solid lubricant across the bearing surfaces.

The metal matrix may be any metal having characteristics making it suitable for use as a bearing material and it has been found that phosphor-bronze gives particularly advantageous results. Conventional solid lubricants may be used and it has been found that PTFE and lead, and molybdenum disulphide and polyimide give acceptable results.

In accordance with an aspect of the present invention a method of producing a material suitable for use as a dry bearing material includes the steps of providing a multiplicity of closely placed small blind holes in a surface of a matrix of metal having characteristics making it suitable for use as a bearing material and filling the said holes with a solid lubricant.

The multiplicity of small holes is generally produced by conventional photolithographic and etching processes using a negative having a pattern of opaque spots of the desired size and in the desired pattern.

The solid lubricant may be a fluorocarbon, for example polytetrafluoroethylene, with or without an additive such as lead, or it may be a lameller solid, for example molybdenum disulphide, with or without a suitable binder for example a synthetic resin such as a polyimide, or a suitable inorganic material such as sodium silicate. The solid lubricant may be applied by known techniques, for example by pressing a paste of the solid in a dispersant fluid in a hydraulic press (PTFE/lead), by hand pressing a similar paste with a flat knife blade ($MoS_2$/polyimide), by rolling, or by burnishing a dry powder ($MoS_2$).

It will be readily apparent that the photolithographic process by which the holes are etched into the matrix metal of bearing materials of the present invention is not limited in application to flat surfaces and accordingly the present invention includes shaped bearing components of the novel dry bearing materials disclosed herein.

Figure 2:
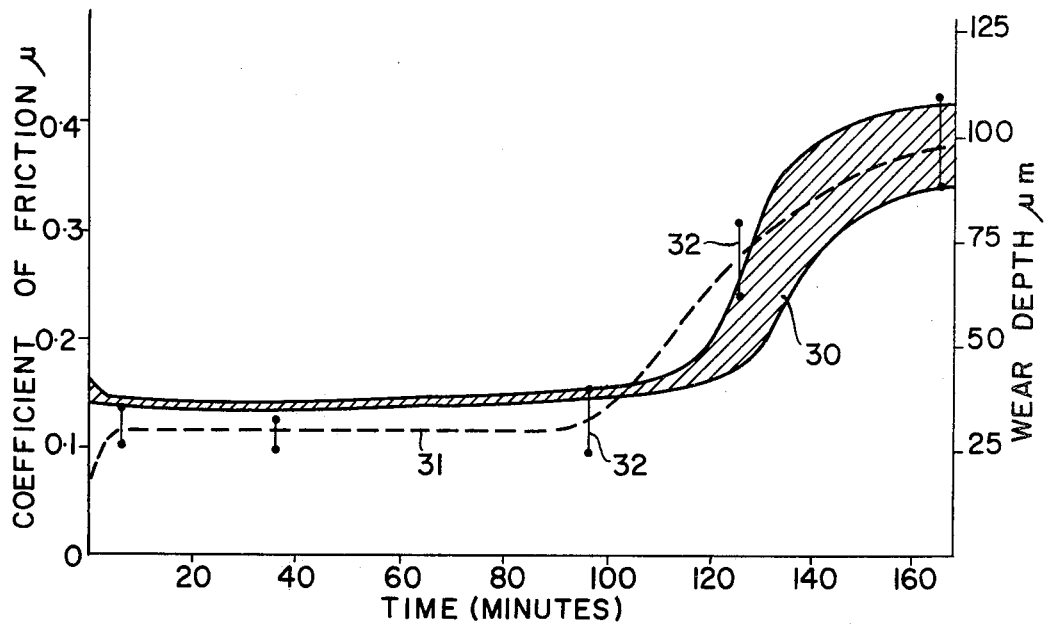
Figure 3:
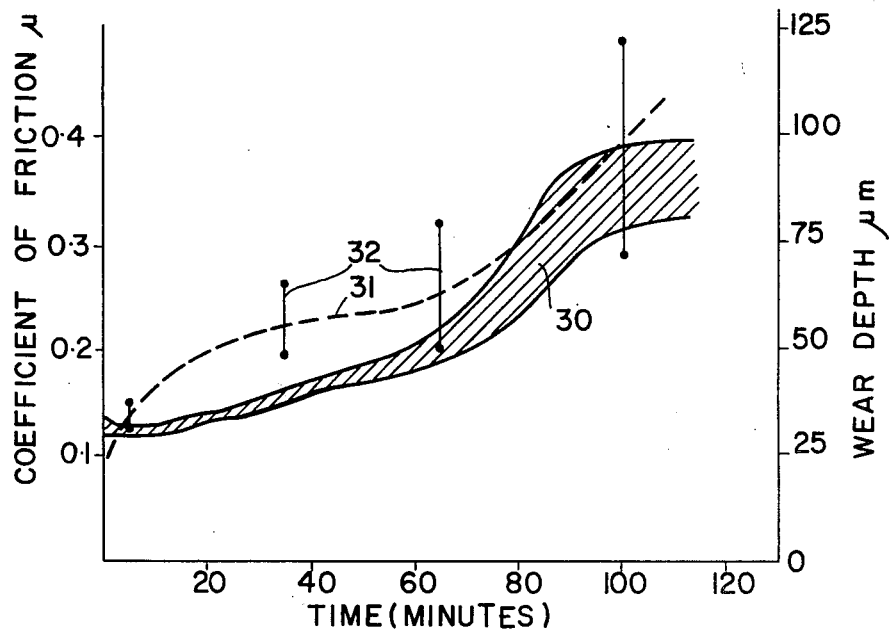

The present invention will now be described, by way of example only with reference to the accompanying drawings in which:

FIG. 1 is a schematic illustration of apparatus arranged to test bearing materials of the present invention, and FIGS. 2 to 10 are graphs representing the friction and wear properties of dry bearing materials of the present invention, except for FIG. 3, which refers to known porous sintered bronze dry bearing materials.

The testing of complete journal or spherical dry bearings at high stress is expensive and time consuming and accordingly the following accelerated test has been devised in order to demonstrate the advantageous properties of bearing materials of the present invention.

Referring now to FIG. 1, which is a schematic representation of apparatus similar to that described by Michalon et al, "Contribution a une Tribometrie Industrielle et Pedagogique." Mem Tech du CETIM No 4 p72 to 95, a strip of the bearing material 10 under test is mounted on a holder 11, itself mounted on a beam 12 having a load 13 at one end and at the other end a reciprocating mechanism 14 connected by a self aligning gimbal assembly (not shown) arranged so that the sample 10 maintains constant and even contact with a metal ring 15 mounted on a shaft 16 and adapted to be rotated by an electric motor 17. A torque transducer 18 is mounted on the shaft 16 by means of which the resistance to rotation of the metal ring 15 by friction against the sample 10 may be determined. The reciprocating mechanism 14 and self aligning gimbal connection are conventional and not shown.

Test apparatus of the type described has the advantage that, apart from the ends of each stroke, the test sample is loaded in line contact and maintained at constant stress irrespective of the wear of either component.

In the test described below the bearing material under test 10 was a strip 6.35 mm wide and 38 mm long and was loaded against a ring 15 of 18% W tool steel, AID 71B, hardened to 800 VPN, randomly abraded with 400 grade silicon carbide paper to a roughness of 0.20 $\mu$mRa, and cleaned ultrasonically in chloroform before use. The sample and holder were reciprocated at a frequency of about 8 cycles per minute over an amplitude of 12.5 mm. The ring 15 has an outside diameter of 25 mm and was rotated at 500 rpm, corresponding to a linear speed of 0.65 m/s ±0.0034 m/s, depending on the direction of rotation during reciprocation. The load range available was 70 to 400 N, corresponding to line contact stresses between a hardened steel ring and a bronze plate of 145 to 345 MPa. Because of the position of the pivot around which reciprocation occurs there is a load variation at the centre of the stroke depending upon direction of movement. In the particular apparatus used in the tests hereindescribed this amounted to +7.7% and −6.1%.

The depth of wear of the sample 10 was measured periodically using a profilometer.

For the purposes of these tests failure was defined as having taken place when the coefficient of friction rose to about 0.2.

EXAMPLE 1

This gives comparative results as between a bronze based material of the present invention and a porous bronze bearing material of known type each employing PTFE/lead as the solid lubricant.

The matrix metal for the material of the present invention was a phosphor-bronze (BS 1400-PB4-C) having a composition of Cu-9.5% Sn-0.5% P and was chill-cast with a hardness of 120 VPN. A pattern of holes was produced in the metal by a photolithographic and etching process as follows.

The surface to which the photoresist is to be applied was cleaned by polishing with a small amount of fine abrasive on a tissue followed by rinsing in dry methanol and blowing dry with a stream of nitrogen gas. The surface was pretreated to promote adhesion of the photoresist by immersion in an 8% solution of hydrochloric acid at room temperature for 30 seconds, followed by rinsing in water and baking at 110° C. for 10 minutes to drive away any surface moisture.

KPR3 photoresist (supplied by Kodak Ltd) was applied to the surface by a Lee Smith Whirler at Variac setting 45. After several hours at room temperature the material was pre-baked at 70° C. for 5 minutes to ensure complete removal of solvent.

A negative having a regular array of opaque discs of 0.27 mm diameter at a centre to centre spacing (or pitch) of 0.5 mm was placed on the photoresist and exposed for three hours to ultra-violet light using a high pressure mercury ultra-violet source having a collimated output beam. The unhardened photoresist was removed by spraying with KDR developer (supplied by Kodak Ltd) for 90 seconds at 4 lb/in$^2$ followed by a spray rinse with KTFR (supplied by Kodak Ltd) for a further two minutes. The material was dried for 3 hours at room temperature and the remaining resist finally hardened by baking in air at 110° C. for 20 minutes.

The etchant was an aqueous solution of ferric chloride applied by spraying at 8 lb/in$^2$ during which time the surface was moved in a controlled manner in a plane perpendicular to the spraying direction. The length of time necessary to produce holes of a given depth may be determined by trial and error but in the present instance a time of 16 minutes was used. The remaining photoresist was removed with trichloroethylene.

After this treatment the phosphor-bronze material was found, on measurement, to have an array of holes of diameter 0.39±0.02 mm; depth 0.08±0.01 mm; pitch 0.45±0.02 mm.

The solid lubricant was PTFE (Fluon GP1 supplied by ICI Ltd) containing 26% by volume of lead and was prepared by placing an aqueous suspension of 0.2 micron diameter PTFE together with an organic fluid such as toluene or petroleum ether (12 g of fluid for 100 g of suspension) and thoroughly stirred. The required amount of lead (as a powder of size less than 100 mesh) was added with thorough stirring. The dispersion was coagulated to a thick paste by the addition of an ionic salt (aluminium chloride) and excess liquid removed by evaporation at 80° C. until the paste consisted essentially of PTFE and lead.

The paste was applied in a hydraulic press, the etched phosphor bronze backings being thoroughly degreased and lightly abraded to give a surface finish of about 0.4 $\mu$m R$_a$. Pressing was carried out at ambient temperature down to stops to give a surface layer of PTFE/lead paste of thickness 0.050 to 0.075 mm. Aluminium foil was placed over the paste to prevent sticking. After removal from the press, the desired PTFE/lead paste thickness of 0.013 to 0.025 mm was obtained by hand lapping with 400 grit silicon carbide paper. The PTFE was sintered by heating at 80° C. for 30 minutes to drive off the bulk of remaining volatiles; slowly raising the temperature to 280° C. and holding for 20 minutes to achieve full drying; and slowly raising the temperature to 385° C. and holding for one hour.

A porous bronze bearing material was prepared from bronze powder of substantially the above composition of major constituents deposited upon a steel substrate and impregnated with the PTFE/lead paste.

The materials were tested in the apparatus described in FIG. 1 with a load of 250 N, corresponding to a line stress of 265 MPa at the test sample. FIGS. 2 and 3 are the results for the material of the present invention and for the porous bronze material respectively.

In each of the figures the abscissa refers to time; the left-hand ordinate indicates the coefficient of friction (the hatched area 30 includes short time fluctuations, together with fluctuations arising from the load variation caused by the pivot position mentioned above); and the right-hand ordinate indicates the depth of wear (dotted line 31 represents the mean curve and the bars 32 represent maximum variations across the width of the sample).

Consideration of FIG. 2 indicates that the phosphor-bronze matrix bearing material of the present invention after a short bedding-in period has a wear and friction plateau which lasts for a considerable proportion of the time up to failure as defined by rise of the coefficient of friction to a value greater than 0.2. After the plateau the coefficient of friction rises fairly rapidly at which point the mean depth of wear is about 50–75 $\mu$m. Friction and wear of the porous bronze bearing material is somewhat irregular (see FIG. 3) although the failure point is similar, the mean wear depth in the region 50 to 75 $\mu$m as the coefficient of friction exceeds 0.2.

However it should be noted that the bearing material of the present invention had a life of almost twice that of the porous bronze bearing material.

EXAMPLE 2

An etched phosphor-bronze matrix identical to that described in Example 1 was impregnated with molybdenum disulphide using polyimide resin as a binding medium.

The polyimide (grade QX13 supplied by ICI Ltd) was dissolved in an equal weight of acetone and molybdenum disulphide (Molypaul No 3 supplied by K S Paul Ltd to DEF 2304 - particle size <100 mesh) was added in an amount approximately equal to 7/5 of the weight of the polyimide used. This gives a final product containing about 60% by weight of molybdenum disulphide.

This was applied to the phosphor bronze matrix material by hand pressing the paste into the pores with a flat knife blade. This left a thick rough surface layer of molybdenum sulphide/polyimide material, which was first cured by heating to 60° C. and holding at that temperature for 30 minutes; heating slowly to 210° C. and holding for two hours; and heating slowly to 400° C. and holding for 30 minutes. The excess molybdenum sulphide/polyimide material was removed by lapping successively with 80, 150 and 400 grit silicon carbide papers. The molybdenum disulphide/polyimide material had a tendency to crumble during lapping but examination of cross sections by optical microscopy indicated that the holes were substantially filled with solid lubricant in the undamaged regions.

The bearing material was then tested as set forth in Example 1. The friction and wear properties are set forth in FIG. 4, the abscissa and ordinates of the graph being as defined above and the reference numerals also having the same significance.

EXAMPLE 3

Bearing materials were produced and tested with other metals as the matrix material. These were a low alloy steel (EN47) having the composition 0.45/0.55% C - 0.5% Si - 0.5/0.8% Mn - 0.8/1.2% Cr - 0.15% V - 0.05% S & P in two hardness levels; hot rolled (200 VPN), and hardened and tempered (650 VPN) and a cobalt alloy, Stellite (SF1), having the composition Co - 1% C - 19% Cr - 13% Ni - 13% W - 3%/Si - 2.5% B, plasma sprayed as a 0.4 mm thick coating on mild steel and having hardness 730 VPN.

The unhardened steel (200 VPN) was etched by cleaning in the manner described in Example 1 for phosphor bronze followed by a surface pretreatment consisting of immersion in a 10% nitric acid solution for 30 seconds followed by a thorough water rinse and baking for 10 minutes at 110° C.

KMER photoresist (supplied by Kodak Ltd) was applied and used as described in Example 1 with an ultra-violet light exposure time of 2½ hours followed by removal of the unhardened resist by spraying KTFR developer (supplied by Kodak Ltd) at 4 lb/in² for 2 minutes followed by a 2 minute KTFR rinse. Air drying and post-bake was as described in Example 1.

Ferric chloride was the chemical etchant and the process was carried on for 40 minutes.

The hardened steel (650 VPN) was treated in the same way as the unhardened steel (200 VPN) except that the etching time was increased to 1 hour 20 minutes.

The cobalt alloy (stellite) was cleaned as described in Example 1 and pretreatment was found to be unnecessary. The application of the photoresist was as described above for the steel specimens but a more powerful ultra-violet source was used enabling the exposure time to be shortened to 20 minutes.

The stellite specimen was electro-etched at 20 V and a controlled temperature of 30° C. for 30 minutes with an electrolyte consisting of a mixture of 23% perchloric acid and 77% acetic acid by volume.

The hole sizes achieved in each of these matrix materials is given in the Table below.

One matrix of each metal was impregnated with each of the solid lubricants described above (six specimens in all) by the relevant methods described in Examples 1 and 2 and subjected to testing as described above. The results are given in FIGS. 5 to 10 inclusive, the abscissa and ordinates of the graphs being as defined above and the reference numerals all having the same significance. The key indicating which Figure refers to which etched matrix/lubricant combination is also given in the Table below. The load was 250 N which corresponds to a line stress of 320 MPa and 340 MPa for the steel and stellite specimens respectively.

TABLE

Figure 4:
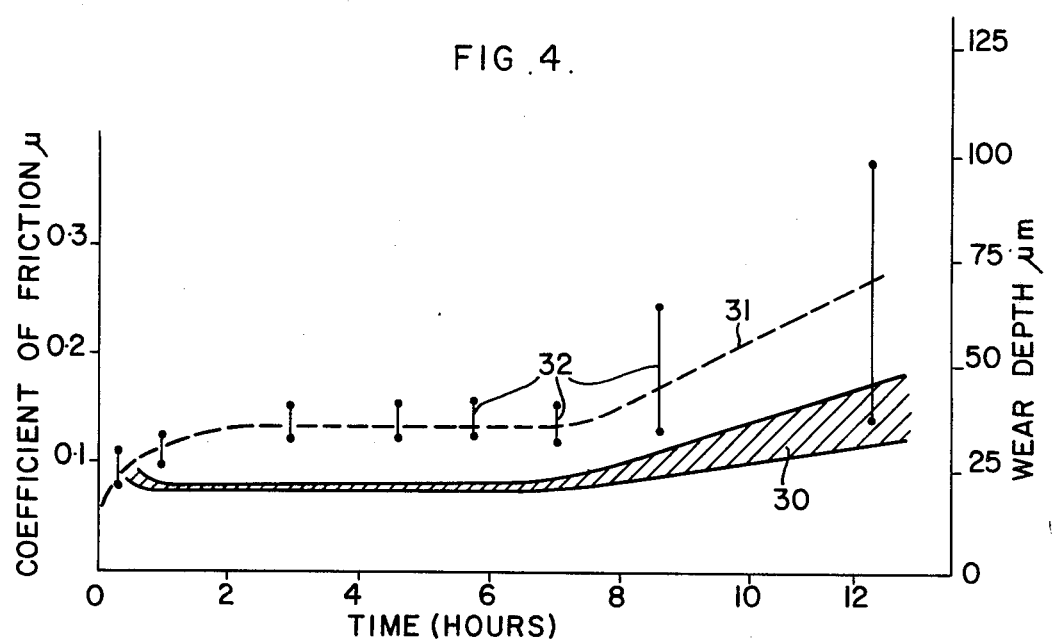
Figure 7:
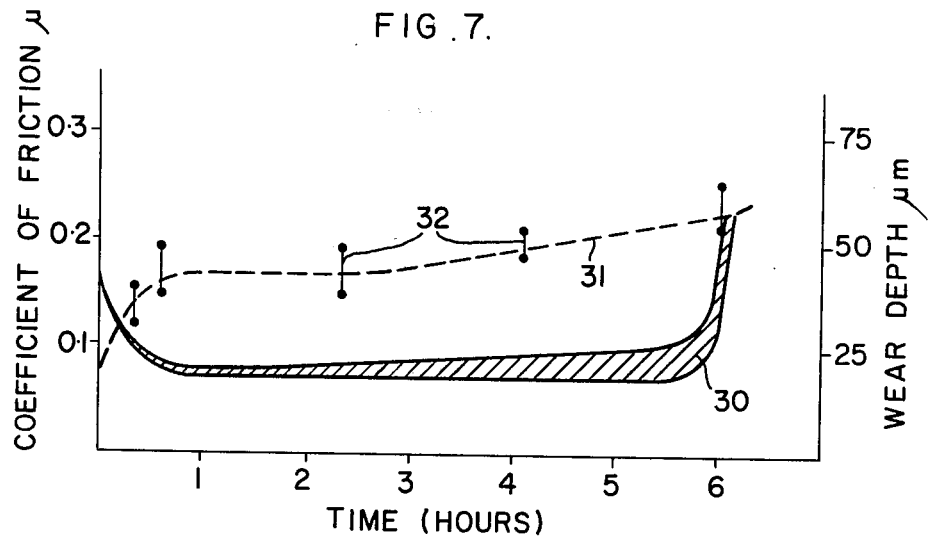
Figure 8:
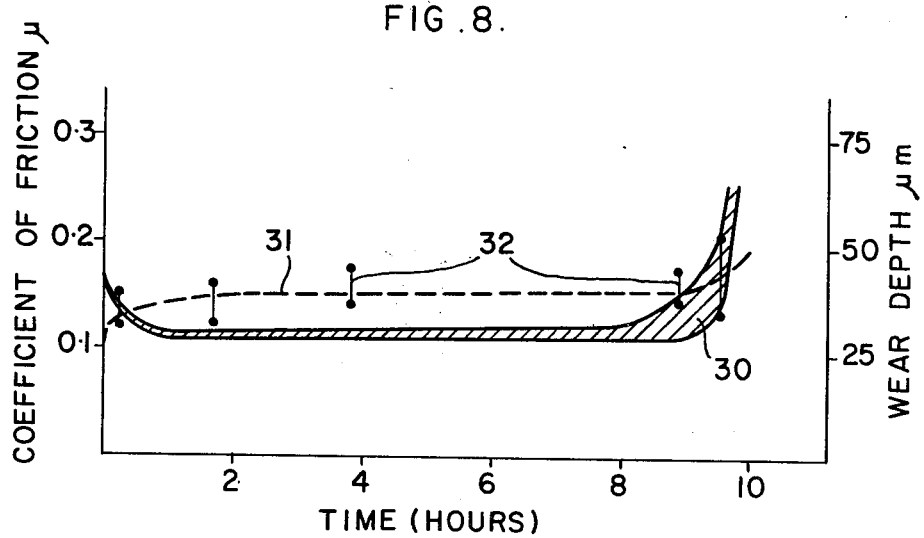
Figure 9:
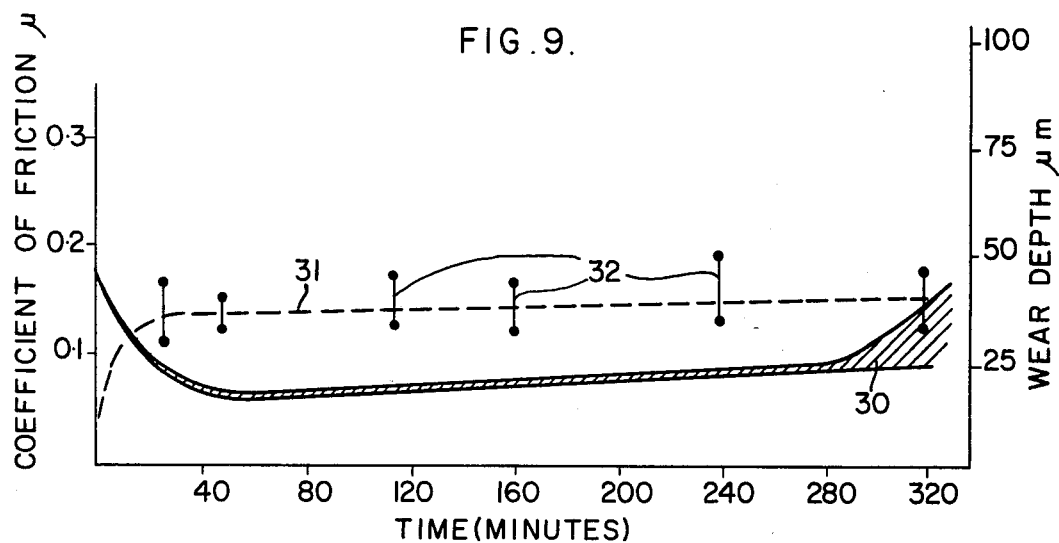
Figure 10:
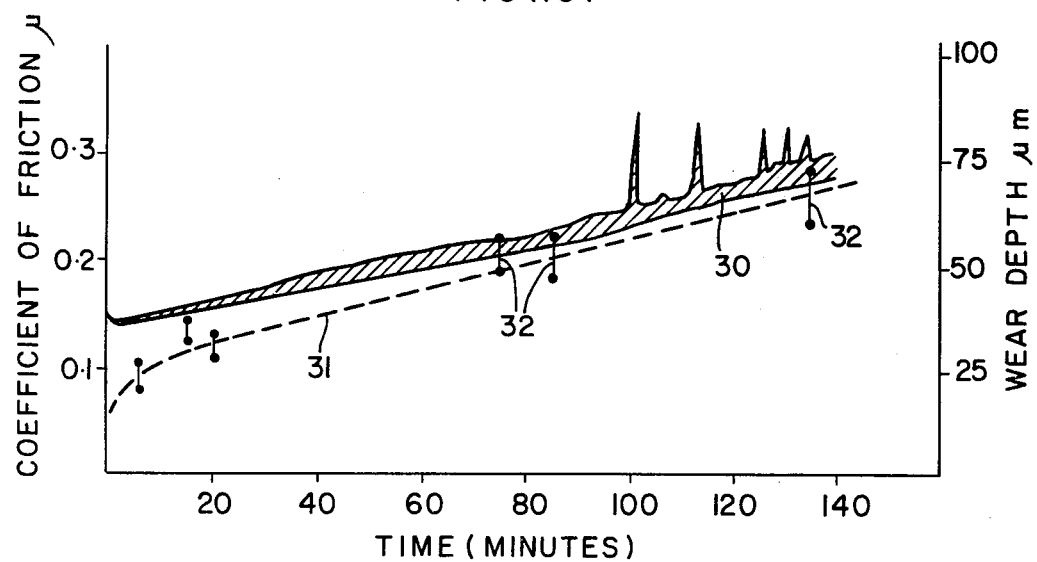

| Matrix | (Dimensions of Holes) | | | PTFE/lead | MoS₂/Polyimide |
| | Diameter mm | Depth mm | Spacing mm | | |
| --- | --- | --- | --- | --- | --- |
| EN7 (200 VPN) | 0.40 ± 0.02 | 0.068 ± 0.01 | 0.46 ± 0.01 | FIG. 4 | FIG. 5 |
| EN7 (650 VPN) | 0.39 ± 0.01 | 0.06 ± 0.01 | 0.40 ± 0.01 | FIG. 6 | FIG. 7 |
| Stellite | 0.42 ± 0.02 | 0.058 ± 0.01 | 0.46 ± 0.01 | FIG. 8 | FIG. 9 |

By study of the graphs of friction and wear properties it will be apparent that the materials disclosed are capable of operating as dry bearings under high stress for periods of time at least equivalent to, and often much greater than those attained by a porous bronze/PTFE/lead composites.

I claim:

1. A material suitable for use in a dry bearing or as a lining in a dry bearing which comprises a matrix of metal having a multiplicity of closely spaced, small blind holes introduced at selected uniformly spaced sites in its bearing surface, said holes being confined essentially to said bearing surface and said matrix being otherwise non-porous, the said holes being filled with a solid lubricant, said holes having an average diameter less than 1 mm and an average center-to-center spacing less than 1 mm.

2. A material as claimed in claim 1 and wherein the said holes have a diameter of less than 1 mm and a spacing between centres of less than 1 mm.

3. A material suitable for use in a dry bearing or as a lining in a dry bearing which comprises a matrix of metal having characteristics making it suitable for use as a bearing material having a multiplicity of closely spaced small, blind holes uniformly distributed over its bearing surface, the said holes being filled with a solid lubricant, and having an average diameter less than 1 mm and an average center-to-center spacing less than 1 mm.

4. A material as claimed in claim 3 and wherein the matrix metal is bronze.

5. A material as claimed in claim 3 and wherein the solid lubricant is a fluorocarbon or a lamellar solid.

6. A material as claimed in claim 5 and wherein the solid lubricant is polytetrafluoroethylene and includes an additive.

7. A material as claimed in claim 6 and wherein the additive is lead.

8. A material as claimed in claim 3 and wherein the solid lubricant is molybdenum disulphide.

9. A material as claimed in claim 3 and wherein the solid lubricant is molybdenum disulphide together with a synthetic resin as binder.

10. A material as claimed in claim 9 and wherein the binder is a polyimide.

11. A dry bearing component wherein the bearing surface is a material as claimed in claim 3.

12. A dry bearing wherein at least one of the bearing surfaces is a material as claimed in claim 3.

13. A method of producing a material suitable for use as a dry bearing material according to claim 1 which includes the steps of
 a. selecting a metal matrix material having characteristics making it suitable for use as a bearing material,
 b. providing a multiplicity of closely spaced, small blind holes in a surface of material selected in step (a), said holes having an average diameter less than 1 mm and an average center-to-center spacing less than 1 mm,
 c. filling the said holes provided in step (b) with solid lubricant.

14. A method as claimed in claim 13 and wherein the step (b) is a metal etching process.

15. A method as claimed in claim 14 and wherein the etching process comprises the steps of
 (a) applying a photoresist to the surface of the metal matrix,
 (b) placing thereon a negative having a pattern of opaque spots corresponding to the desired multiplicity of closely spaced, small, blind holes,
 (c) exposing the negative and photoresist to an appropriate light source,
 (d) removing the negative and contacting the photoresist with a developer to remove unexposed photoresist,
 (e) applying an etching agent for the metal matrix,
 (f) removing the remaining photoresist, and
 (g) filling the holes with a solid lubricant.

16. A dry bearing component having a lubricated surface including an integral metal matrix having chemically etched into the bearing surface thereof a multiplicity of closely spaced, small, blind holes uniformly spaced over the metal surface, the said holes being filled with a solid lubricant, having an average diameter less than 1 mm and an average center-to-center spacing less than 1 mm.

17. A material as claimed in claim 1 wherein said holes have an average diameter of about 0.39 to about 0.42 mm and an average center-to-center spacing of about 0.40 to about 0.46 mm.

18. A material as claimed in claim 3 wherein said holes have an average diameter of about 0.39 to about 0.42 mm and an average center-to-center spacing of about 0.40 to about 0.46 mm.

19. A method as claimed in claim 13 wherein said holes have an average diameter of about 0.39 to about 0.42 mm and an average center-to-center spacing of about 0.40 to about 0.46 mm.

20. A material as claimed in claim 16 wherein said holes have an average diameter of about 0.39 to about 0.42 mm and an average center-to-center spacing of about 0.40 to about 0.46 mm.

21. A dry bearing component having a lubricated surface including an integral metal matrix having chemically etched into the bearing surface thereof a multiplicity of closely spaced, small, blind holes having an average diameter in the range of about 0.39 to about 0.42 mm and an average center-to-center spacing in the range of about 0.40 to about 0.46 mm, said holes being uniformly spaced over the metal surface and filled with a solid lubricant.

* * * * *